United States Patent [19]

Trinkwalder

[11] 4,226,257
[45] Oct. 7, 1980

[54] SCUBA REGULATOR

[75] Inventor: Joseph C. Trinkwalder, North Tonawanda, N.Y.

[73] Assignee: Sherwood-Selpac Corporation, Lockport, N.Y.

[21] Appl. No.: 891,637

[22] Filed: Mar. 30, 1978

[51] Int. Cl.³ ............................................ F16K 17/36
[52] U.S. Cl. .............................. 137/81.2; 137/DIG. 9; 137/505.25; 137/514.7
[58] Field of Search ..................... 137/505.25, 505.28, 137/505.41, 505.42, 514.7, DIG. 9, 81

[56] References Cited

U.S. PATENT DOCUMENTS

| | | | |
|---|---|---|---|
| 2,270,304 | 1/1942 | Jacobsson | 137/505.41 X |
| 2,721,576 | 10/1955 | Grove | 137/505.28 |
| 2,855,950 | 10/1958 | Phillips | 137/505.28 |
| 2,982,294 | 5/1961 | Koutnik | 137/505.42 X |
| 3,004,686 | 10/1961 | McKee | 137/505.28 X |
| 3,212,516 | 10/1965 | Natho | 137/505.42 X |
| 3,618,690 | 11/1971 | Johnson | 137/514.7 |
| 3,685,533 | 8/1972 | Krechel | 137/505.25 X |

Primary Examiner—Harold W. Weakley
Attorney, Agent, or Firm—Christel, Bean & Linihan

[57] ABSTRACT

This invention relates to pressure regulators used in scuba diving wherein a pressure sensing means is employed to actuate an associated valve member for controlling pressure in the regulator. Specifically, the instant invention relates to that portion of the regulator housing including biasing means operably connected to said pressure sensing means wherein a pressure relief opening is provided in the regulator housing so as to expose the biasing means to ambient pressure conditions. The instant invention teaches the provision of a pressure bleed means for transmitting pressurized air through the regulator housing portion including the biasing means and outwardly through said relief opening. By this arrangement ambient water may not pass into the regulator housing through said relief opening which could otherwise result in potentially adverse effects on the operation of the biasing means.

2 Claims, 3 Drawing Figures

SCUBA REGULATOR

BACKGROUND OF THE INVENTION

This invention relates generally to pressure regulators, and more particularly to pressure regulators for use in underwater breathing apparatus.

Within the past several decades, the sport of skin-diving has enjoyed considerable popularity, so that today there exists an entire industry for supplying equipment for this sport. This industry manufactures and sells a wide variety of instruments, devices and equipment to enable a person to properly breathe underwater so as to enable him to retain beneath the surface for extended periods of time.

One of the most vital concerns in the manufacture of underwater breathing apparatus is the need for a source of air at substantially constant pressure. That is, in order to enable a person to breathe properly and hence function as desired, it is necessary to have a source of air the pressure of which does not fluctuate haphazardly or at random.

In this regard, pressure regulators have been developed which employ a floating pressure sensing device and associated valve stem and valve member movable therewith for controlling the flow of breathing air from a variable pressure source past the valve member. For example, it is known to apply the desired pressure output from the regulator to a floating piston in a manner so that an associated valve tends to close off a pressure source. Within this framework, biasing means have been applied to the floating piston to counteract the pressure applied thereto so that the associated valve member tends to open and increase the pressure supply. In this manner, with a biasing means operable to afford a substantially constant force throughout the range of travel of a piston, a substantially constant output pressure can be maintained. Furthermore it is common to provide an opening in the regulator housing surrounding the biasing means so that changing ambient pressure can be transmitted to the biasing means, thus increasing the regulated pressure as ambient pressure increases and conversely, reducing the regulated pressure as ambient pressure decreases.

Within the above structural context, a distinct and potentially dangerous problem has been encountered by scuba divers in very cold water. Necessarily, ambient water flows into a regulator housing through the above relief openings so as to immerse the biasing means; and should such water be cold enough, it is possible for icing to develop which would inhibit the proper functioning of the biasing means, which in turn could lead to malfunctioning of the entire regulator. It would also be possible for solid contaminants, sand, etc. to enter the regulator housing, thus greatly reducing regulator useful life.

SUMMARY OF THE INVENTION

Accordingly, the principal object of the present invention is to provide an improved pressure regulator for use by scuba divers wherein the potentially adverse effect of relatively cold and/or contaminated water on the biasing means of prior art regulators can be eliminated.

In summary, the present invention provides a pressure bleed means which is in operable communication with the portion of the regulator housing including the biasing means and pressure relief opening. The pressure bleed means transmits a predetermined amount of regulator output pressure to the portion of the housing having the biasing means for exhaustion through the pressure relief opening therein so that ambient water may not pass into the housing through the relief opening. Necessarily, in this arrangement, the ambient water will not come into contact with the biasing means.

The foregoing and other objects, advantages, and characterizing features of the present invention will become clearly apparent from the ensuing detailed description of an illustrative embodiment thereof, taken together with the accompanying drawings wherein like reference characters denote like parts throughout the various views.

DETAILED DESCRIPTION OF THE PREFERRED EMBODIMENT

Figure 1:
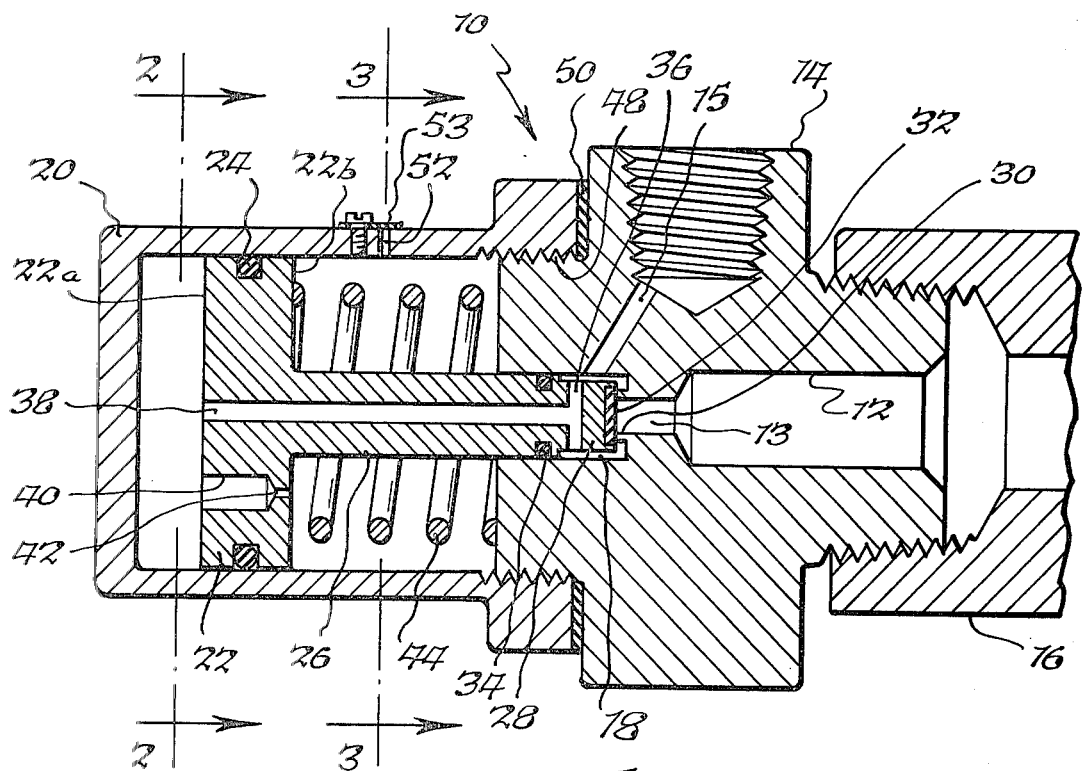
FIG. 1 is a longitudinal view in section of a pressure regulator maintaining a constant output pressure and incorporating a pressure bleed means as taught by this invention.
Figure 2:
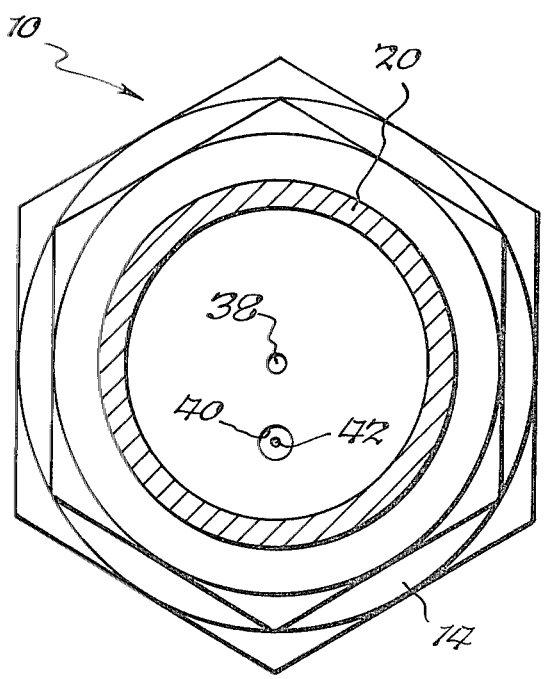
FIG. 2 is a transverse view, partly in section, taken about on line 2—2 of FIG. 1.
Figure 3:
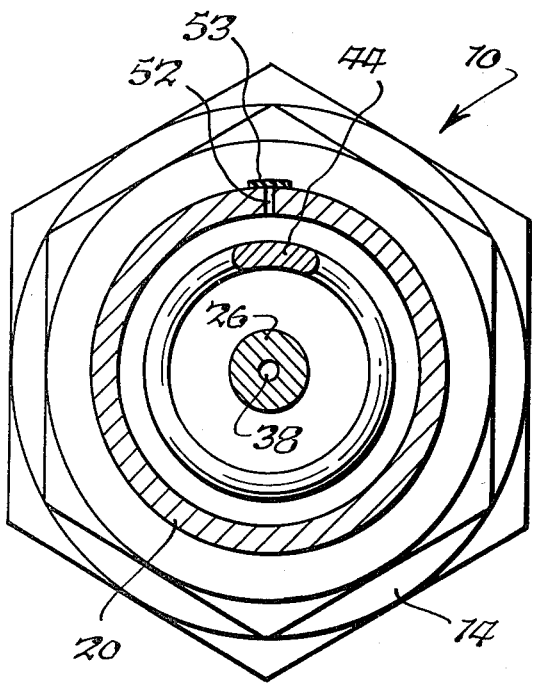
FIG. 3 is a transverse view, partly in section, taken about on line 3—3 of FIG. 1.

Referring now in detail to the illustrative embodiment depicted in the accompanying drawings, there is shown in FIG. 1 a pressure regulator 10 having an inlet end portion 12 and an outlet end portion 14. The inlet end portion 12 is adapted for connection to a source of fluid pressure such as a tank of pressurized breathing air as conventionally used by scuba divers. An output portion 16 of such a breathing tank is shown in fragmentary form in operative connection with the inlet portion 12.

The inlet end portion 12 includes an inlet passage 13 which leads to a pressure chamber 18. Adjacent to pressure chamber 18 and in communication therewith is an outlet passage 15 disposed in outlet end portion 14.

A valve actuator housing 20 is disposed adjacent to pressure chamber 18. A floating piston 22 is slidably mounted within housing 20 for movement therein in a sealed manner by means of the sealing ring 24 which is disposed in the circumferential surface of piston 22 so as to interact with the interior wall of housing 20. Piston 22 has associated therewith a valve stem 26 and a valve member 28. The valve member 28 and valve stem 26, being integrally formed with piston 22, undergo movement therewith. Valve member 28 is adapted to engage a valve seat 30 formed as part of the inlet end portion 12. In this regard, the valve member 28 carries a sealing element 32. The valve stem 26 carries a sealing member 34 which sealingly engages that portion of the regulator body in which the valve stem is mounted. The valve member 28 and valve stem 26 respectively include connecting passages 36 and 38 whereby pressure in chamber 18 is openly communicated to the chamber defined in the lefthand interior of housing 20 and end surface 22a of piston 22.

A pressure bleed means in the form of a passage opening 40 is provided in piston 22 to extend between piston end surface 22a and piston end surface 22b. As will be more fully described hereinbelow, the passageway 40 is further formed with an orifice configuration 42 adjacent to the piston end surface 22b.

A biasing means in the form of coil spring 44 is provided within the valve actuator housing 20 to engage the end surface 22b if piston 22 so as to urge the latter, as well as the valve stem 26 and valve member 28, away from valve seat 30.

The valve actuator housing 20 is affixed to the main body portion of the regulator by means of a threaded engagement at 48 and is sealed with respect to the main portion of the regulator by use of a sealing gasket 50. However, a pressure relief opening 52 is provided through the wall of the valve actuator housing 20 so as to insure that ambient pressure will be reflected in the chamber defined by end surface 22b of the piston, the right-hand portion of housing 20 and the main body of the regulator. A check valve 53 is provided over vent hole 52 to prevent water from entering, while allowing for exhaust of air from orifice 42.

As described in part hereinabove, it has been common practice in the prior art to provide a pressure relief opening such as 52 to provide communication of ambient pressure changes to surface 22b of piston. Accordingly, the force exerted by spring 44 and ambient pressure conditions can be predicted.

In the general use of the regulator 10, a supply pressure on the order of 200 to 4,000 psi may be supplied through inlet passage 13—in other words, the supply pressure undergoes considerable variation as the breathing air is consumed. The principal purpose of regulator 10, therefore, is to provide or rather maintain a constant output pressure, for example on the order of 150 psi above ambient, which in turn can be effectively consumed by a user of associated scuba diving apparatus.

Accordingly, the regulated pressure, say 150 psi, is to be maintained in the pressure chamber 18 which in turn communicates such regulated pressure to the output passage 15 disposed in the outlet end portion 14. Furthermore, the regulated pressure in chamber 18 is communicated to the end surface 22a of piston 22 by the passage 36 and 38. As to be understood by those skilled in the art, the regulated pressure acting on surface 22a of piston 22 imparts a specified force on the piston tending to urge the same to the right so as to close valve member 28 against the valve seat 30. To counteract this tendency, biasing means, such as spring 44, can be formed to engage surface 22b of the piston so as to be operable to afford substantially a constant force on piston 22 throughout its range of travel with respect to a regulated pressure in chamber 18. The force of spring 44 is transmitted to end surface 22a of the piston.

Should the valve member 28 tend to close against valve seat 30 too much so that the pressure in chamber 18 falls below the desired regulated level, the force applied to end surface 22a of the piston proportionately decreases and the biasing means 44 would tend to open the valve member 28 so as to increase the pressure in chamber 18 and corresponding pressure applied to surface 22a of the piston. Conversely, if the valve member 28 tends to open too much with respect to valve seat 30, the pressure in chamber 18 would exceed the desired regulated level and the corresponding greater amount of force applied to end surface 22a of the piston would tend to move the latter to the right, as viewed in FIG. 1, against the biasing means 44 so as to close down the valve member 28 until the regulated pressure level is reached. In this manner of employing counterbalancing forces, a substantially regulated pressure level is maintained in the output passage 15.

When the regulator is in use, water necessarily could pass inwardly of housing 20 through the pressure relief opening, 52, absent the present invention, so as to completely fill the volume of space in which the biasing spring 44 is disposed. This water would be necessary to transmit ambient water pressure to surface 22b of piston. Normally, this would not present a problem; but when the regulator is used in extremely cold water, potential icing can take place about the biasing spring 44 which would preclude proper functioning thereof. Under such circumstances, a highly dangerous situation could be presented if, for example, the biasing means 44 became inoperative and the force exerted on end surface 22a of the piston urged the valve member 28 to close against the valve seat 30.

With a view towards the potential safety hazard related to water, and particularly very cold water, being present in the area of housing 20 including the biasing spring 44, the present invention teaches the provision of the pressure bleed means 40 to maintain the housing 20 free of ambient water. A continuous flow of air, restricted in amount by orifice 42, flows into the housing 20 around spring 44 outwardly through the pressure relief opening 52. A check valve 53 is provided over vent hole 52 to prevent water from entering, but allow exit of air from orifice 42. This condition exists only when external pressure is greater than internal pressure. In this manner, ambient water cannot flow inwardly through the opening 52. Due to the relative configuration and size of the orifice 42, the loss of breathing air will be relatively insignificant. Also, the effective operation of the bleed orifice 42 and relief opening 52 can be readily checked by a scuba diver by simply placing the regulator under water and watching for air bubbles passing outwardly of opening 52. Although passage 40 and orifice 42 are shown in FIG. 1 as part of piston 22, necessarily equivalent types of passages could be potentially formed in the valve stem 26 or the outlet end portion of the regulator so as to bleed air into the housing 20 about the biasing spring 44.

From the foregoing, it is apparent that the objects of the present invention have been fully accomplished. As a result of this invention, an improved pressure regulator for use particularly with scuba diving equipment is provided for increasing the safety thereof.

Having thus described and illustrated a preferred embodiment of my invention, it will be understood that such description and illustration is by way of example only and that such modifications and changes as may suggest themselves to those skilled in the art are intended to fall within the scope of the present invention as limited only by the appended claims.

I claim:

1. In combination with underwater breathing apparatus: a pressure regulator for maintaining a substantially constant output pressure level at a given ambient condition notwithstanding variations in pressure at the source thereof, said regulator having an inlet end portion and an outlet end portion, said inlet portion being adapted for connection to a source of fluid pressure, a pressure chamber disposed intermediate to and in communication with said inlet and outlet end portions for providing a substantially constant pressure level to said outlet end portion, a valve actuator housing disposed adjacent to said pressure chamber, a pressure sensing means mounted in a sealed manner in said valve actuator housing, said pressure sensing means including a valve stem and valve member for movement therewith, said valve stem being slidably disposed in said pressure chamber and said inlet end portion having a valve seat adjacent to said pressure chamber for flow controlling cooperation with said valve member, means for communicating pressure in said pressure chamber to an end surface of said pressure sensing means so that the latter tends to urge said valve member against said valve seat, biasing means in said valve actuator housing biasing said pressure sensing means so that said valve member tends to move away from said valve seat wherein said biasing means is operable to afford substantially a constant biasing force to said pressure sensing means throughout its range of travel for a predetermined pressure in said pressure chamber so that said predetermined pressure is maintained substantially constant and is communicated to said outlet end portion, and a pressure relief opening disposed in said valve actuator housing for providing open communication between the interior and exterior of said housing for transmitting changing water pressure to said biasing means to change the regulator output pressure in response to changing water pressure; the improvement comprising:

orifice means comprising a passage having one end in fluid communication with said pressure chamber and another end in fluid communication with the interior portion of said valve actuator housing in which said pressure relief opening is located for constantly transmitting a minor portion of said predetermined pressure in said pressure chamber from said chamber to said valve actuator housing for exhaustion through said pressure relief opening while the rest of said predetermined pressure is communicated to said outlet end portion, said pressure relief opening having a check valve means operable in conjunction with said pressure relief opening so that ambient water may not pass into said housing through said relief opening when ambient water pressure is greater than the pressure in said housing.

2. An improvement in a pressure regulator as set forth in claim 1 wherein said pressure bleed means comprises an opening extending between the end surfaces of said pressure sensing means.

* * * * *